United States Patent
Chun et al.

(10) Patent No.: US 8,630,531 B2
(45) Date of Patent: Jan. 14, 2014

(54) APPARATUS AND METHOD FOR REPRODUCING STORAGE MEDIUM THAT STORES METADATA FOR PROVIDING ENHANCED SEARCH FUNCTION

(75) Inventors: Hye-jeong Chun, Yongin-si (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 12/765,517

(22) Filed: Apr. 22, 2010

(65) Prior Publication Data

US 2010/0202753 A1   Aug. 12, 2010

Related U.S. Application Data

(63) Continuation of application No. 11/325,490, filed on Jan. 5, 2006.

(30) Foreign Application Priority Data

Jan. 7, 2005   (KR) .................................. 2005-1749

(51) Int. Cl.
*H04N 9/80* (2006.01)
*H04N 5/84* (2006.01)
*H04N 5/89* (2006.01)

(52) U.S. Cl.
USPC ......................................... 386/248; 386/332

(58) Field of Classification Search
USPC ......................................... 386/248, 332–336
See application file for complete search history.

(56) References Cited

U.S. PATENT DOCUMENTS 5,694,381 A   12/1997   Sako
5,999,696 A   12/1999   Tsuga et al.
(Continued)

FOREIGN PATENT DOCUMENTS

CN   1142112 A   2/1997
CN   1199908 A   11/1998
(Continued)

OTHER PUBLICATIONS

Chinese Office Action issued Sep. 26, 2011, in counterpart Chinese Application No. 201010003912.6 (9 pages, including English translation).

(Continued)

*Primary Examiner* — Thai Tran
*Assistant Examiner* — Nigar Chowdhury
(74) *Attorney, Agent, or Firm* — NSIP Law

(57) ABSTRACT

An apparatus and method for reproducing a storage medium that stores metadata are provided for an enhanced search function using various search keywords of audio-visual (AV) data. The apparatus includes: a search unit for searching for scenes matching a search keyword by conducting an enhanced search function on the AV data with reference to metadata which contains information regarding at least one search keyword for each of the scenes of the AV data; and a reproducing unit for reproducing the AV data corresponding to at least one scene found by the search unit. The metadata may include information regarding an entry point and/or duration, angles, etc. of each scene. Hence, the enhanced search can be conducted using various search keywords. Further, search results can be reproduced according to diverse scenarios, and the enhanced search function can be provided for movie titles that support multiple angles or multiple paths. Moreover, metadata can be created in multiple languages, thereby enabling the enhanced search function to support multiple languages.

7 Claims, 13 Drawing Sheets

(56) References Cited

U.S. PATENT DOCUMENTS

| | | | |
|---|---|---|---|
| 6,181,872 | B1 | 1/2001 | Yamane et al. |
| 6,289,165 | B1 | 9/2001 | Abecassis |
| 6,360,057 | B1 | 3/2002 | Tsumagari et al. |
| 6,360,234 | B2 | 3/2002 | Jain et al. |
| 6,553,086 | B1 | 4/2003 | Yoo et al. |
| 6,633,903 | B1 | 10/2003 | Gould |
| 6,760,721 | B1 | 7/2004 | Chasen et al. |
| 6,772,125 | B2 | 8/2004 | Harradine et al. |
| 6,799,180 | B1 | 9/2004 | McGrath et al. |
| 7,031,595 | B2 | 4/2006 | Yamaguchi |
| 7,565,060 | B2 | 7/2009 | Hamda et al. |
| 7,764,866 | B2 | 7/2010 | Seo et al. |
| 7,787,755 | B2 | 8/2010 | Seo et al. |
| 7,797,317 | B2 | 9/2010 | Yanagita et al. |
| 8,041,189 | B2 | 10/2011 | Shinkai et al. |
| 2002/0018422 | A1 | 2/2002 | Tonami |
| 2002/0040360 | A1 | 4/2002 | Sohma et al. |
| 2002/0044757 | A1 | 4/2002 | Kawamura et al. |
| 2002/0069218 | A1 | 6/2002 | Sull et al. |
| 2002/0076201 | A1 | 6/2002 | Tsumagari et al. |
| 2002/0164152 | A1 | 11/2002 | Kato et al. |
| 2002/0174430 | A1 | 11/2002 | Ellis et al. |
| 2002/0198864 | A1 | 12/2002 | Ostermann et al. |
| 2003/0061610 | A1 | 3/2003 | Errico |
| 2003/0103604 | A1 | 6/2003 | Kato et al. |
| 2003/0113096 | A1* | 6/2003 | Taira et al. ............... 386/46 |
| 2003/0156504 | A1 | 8/2003 | Kanegae et al. |
| 2003/0167264 | A1 | 9/2003 | Ogura et al. |
| 2003/0229894 | A1 | 12/2003 | Okada et al. |
| 2004/0001700 | A1 | 1/2004 | Seo et al. |
| 2004/0012621 | A1 | 1/2004 | Kaneko et al. |
| 2004/0047588 | A1 | 3/2004 | Okada et al. |
| 2004/0086264 | A1 | 5/2004 | Okada et al. |
| 2004/0139047 | A1 | 7/2004 | Rechsteiner et al. |
| 2004/0170391 | A1 | 9/2004 | Tsumagari et al. |
| 2004/0175146 | A1 | 9/2004 | Tsumagari et al. |
| 2004/0210932 | A1 | 10/2004 | Mori et al. |
| 2004/0215643 | A1 | 10/2004 | Brechner et al. |
| 2004/0220791 | A1 | 11/2004 | Lamkin et al. |
| 2004/0247284 | A1 | 12/2004 | Yamasaki |
| 2004/0267742 | A1 | 12/2004 | Polson et al. |
| 2005/0141869 | A1 | 6/2005 | Kanegae et al. |
| 2005/0163480 | A1 | 7/2005 | Takemoto |
| 2005/0165844 | A1 | 7/2005 | Yanagita et al. |
| 2005/0198006 | A1 | 9/2005 | Boicey et al. |
| 2005/0244137 | A1 | 11/2005 | Takashima et al. |
| 2005/0254363 | A1 | 11/2005 | Hamada et al. |
| 2006/0045473 | A1 | 3/2006 | Alterman |
| 2006/0153535 | A1 | 7/2006 | Chun et al. |
| 2006/0153542 | A1 | 7/2006 | Chun et al. |
| 2007/0140653 | A1 | 6/2007 | Kozuka et al. |
| 2007/0146792 | A1 | 6/2007 | Shiraiwa |
| 2009/0182719 | A1 | 7/2009 | Chun et al. |
| 2010/0217775 | A1 | 8/2010 | Chun et al. |

FOREIGN PATENT DOCUMENTS

| | | |
|---|---|---|
| CN | 1338743 A | 3/2002 |
| EP | 0 685 845 | 4/1995 |
| EP | 0 847 196 | 6/1998 |
| EP | 0 929 072 | 7/1999 |
| EP | 1 102 271 | 5/2001 |
| EP | 1198133 A1 | 4/2002 |
| EP | 1280347 A1 | 1/2003 |
| EP | 1 376 587 A2 | 1/2004 |
| EP | 1521267 A1 | 4/2005 |
| GB | 2 354 105 A | 3/2001 |
| JP | 11-025654 A | 1/1999 |
| JP | 2000-322875 | 11/2000 |
| JP | 2001-155036 A | 6/2001 |
| JP | 2001-216726 | 8/2001 |
| JP | 2001-292425 A | 10/2001 |
| JP | 2002-25224 A | 1/2002 |
| JP | 2002-108892 | 4/2002 |
| JP | 2002-158971 | 5/2002 |
| JP | 2002-373481 | 12/2002 |
| JP | 2003-186885 | 7/2003 |
| JP | 2003-122761 | 4/2005 |
| KR | 10-2003-0033852 A | 5/2003 |
| KR | 10-2004-0066222 A | 7/2004 |
| KR | 10-2004-0094408 A | 11/2004 |
| KR | 2006-11779 | 2/2006 |
| RU | 2228546 | 4/1999 |
| WO | WO-92/22983 A2 | 12/1992 |
| WO | WO 97/22201 | 6/1997 |
| WO | WO 01/82624 | 11/2001 |
| WO | WO 02/08948 | 1/2002 |
| WO | WO 2004/074976 A2 | 9/2004 |
| WO | WO 2004-084214 | 9/2004 |
| WO | WO 2004-086371 A1 | 10/2004 |
| WO | WO 2004/095834 A1 | 11/2004 |
| WO | WO-2004/098183 | 11/2004 |
| WO | WO-2006/073275 | 7/2006 |

OTHER PUBLICATIONS

Japanese Office Action issued Nov. 29, 2011, in counterpart Japanese Application No. 2007-550292 (10 pages, including English translation).

Japanese Office Action issued Nov. 29, 2011, in counterpart Japanese Application No. 2009-066978 (8 pages, including English translation).

Indian Office Action issued on Apr. 19, 2011, in counterpart Indian Application No. 03348/CHEN/2007 (2 pages, in English).

U.S. Appl. No. 11/325,490, filed Jan. 5, 2006, Hye-jeong Chun et al., Samsung Electronics Co., Ltd.

U.S. Appl. No. 12/765,456, filed Apr. 22, 2010, Hye-jeong Chun et al., Samsung Electronics Co., Ltd.

Japanese Office Action issued on Jul. 27, 2010, in corresponding Japanese Patent Application No. 2007-550293 (4 pages).

Extended European Search Report issued on Nov. 26, 2009, in counterpart European Application No. 06702009.9 (10 pages).

PCT International Search Report and Written Opinion issued Mar. 30, 2006 re: International Application No. PCT/KR2006/000051 (10 pp).

Office Action issued in Korean Patent Application No. 2005-1749 on Dec. 1, 2006.

Decision on Grant issued by the Federal Service on Industrial Property, Patents & Trademarks of Russia in Russian Patent Application No. 2007124568/28(026752) on May 28, 2009.

Office Action issued by Japanese Patent Office in Japanese Patent Application No. 2007-550293 on Jun. 30, 2009.

Japanese Office Action issued on Aug. 16, 2011, in counterpart Japanese Application No. 2009-228034 (3 pages).

Examination Report dated Mar. 7, 2012, in counterpart European Patent Application No. 10 169 530.2 (in English, 10 pages).

Summons to Oral Proceedings dated Mar. 23, 2012, in counterpart European Patent Application No. 06702008.1 (in English, 13 pages).

*White paper—Blu-ray Disc Format—2.A Logical and Audio Visual Application Format Specifications for BD-RE*, Blu-ray Disc Founders, Aug. 2004, pp. 1-26 (complete document).

*White paper—Blu-ray Disc Format—2.B Audio Visual Application Format Specifications for BD-ROM*, Blu-ray Disc Association, Mar. 2005, pp. 1-3 (complete document).

*Application Definition—Blu-ray Disc Format—BD-J Baseline Application and Logical Model Definition for BD-ROM*, Blu-ray Disc Association, Mar. 2005, pp. 1-45 (complete document).

Extended European Search Report issued on Nov. 24, 2010, in counterpart European Application No. 10169530.2 (17 pages).

Chinese Notification of Granting of Patent Right to Invention mailed Aug. 6, 2012, issued in counterpart Chinese Patent Application No. 201010003913.0; 8 pages including English translation.

Korean Office Action mailed May 23, 2007, issued in counterpart Korean Patent Application No. 10-2005-0001749; 3 pages.

Korean Office Action mailed Oct. 30, 2007 issued in counterpart Korean Patent Application No. 10-2005-0001749; 2 pages.

Korean Office Action mailed Sep. 14, 2010 issued in counterpart Korean Patent Application No. 10-2005-0108532; 6 pages.

(56) References Cited

OTHER PUBLICATIONS

European Search Report issued on Dec. 18, 2009, in corresponding European Application No. 06702008.1 (11 pages).
U.S. Appl. No. 60/634,546.
International Search Report and Written Opinion issued Mar. 30, 2006, issued in counterpart International Patent Application No. PCT/KR2006/000050 (10 pages).
Malaysian Office Action issued in corresponding Malaysian Patent Application No. PI20060054 dated May 22, 2009.
Taiwanese Preliminary Notice of First Office Action issued in Taiwan Patent Application No. 095100437 on Nov. 26, 2008 (with English translation).
Russian Office Action issued Dec. 24, 2012 in counterpart Russian Application No. 2008151865/28(068181);(11 pages including English translation).

* cited by examiner

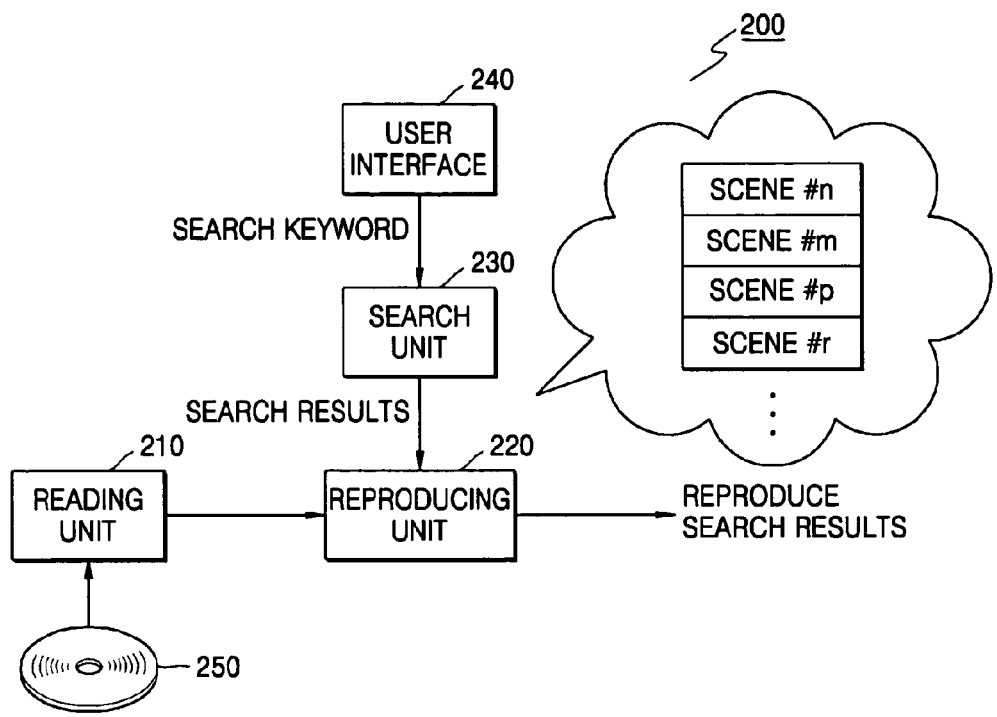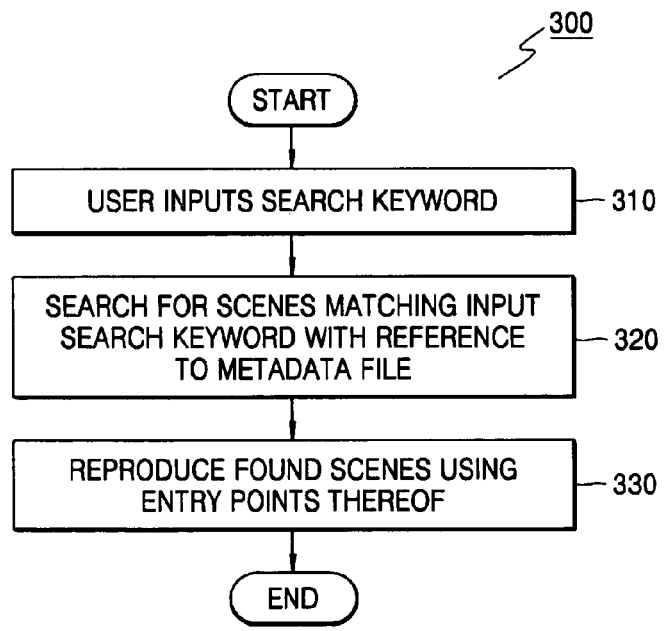

APPARATUS AND METHOD FOR REPRODUCING STORAGE MEDIUM THAT STORES METADATA FOR PROVIDING ENHANCED SEARCH FUNCTION

CROSS-REFERENCE TO RELATED APPLICATIONS

This application is a continuation of U.S. application Ser. No. 11/325,490, which claims all benefits accruing under 35 U.S.C. §119 from Korean Patent Application No. 2005-1749, filed on Jan. 7, 2005, in the Korean Intellectual Property Office, the disclosure of each of which is incorporated by reference herein in its entirety for all purposes.

BACKGROUND OF THE INVENTION

1. Field of the Invention

The present invention relates to reproducing audio-visual (AV) data recorded on a storage medium, and more particularly, to a storage medium including meta data to provide an enhanced search function, an apparatus and method for reproducing AV data from a storage medium that stores metadata for providing an enhanced search function.

2. Related Art

Storage media, such as DVDs and Blu-ray discs (BDs), store audio-visual (AV) data composed of video, audio, and/or subtitles that are compression-encoded according to standards for digital video and audio compression, such as a MPEG (Motion Picture Experts Group) standard. Storage media also store additional information such as encoding properties of AV data or the order in which the AV data is to be reproduced. In general, moving pictures recorded on a storage medium are sequentially reproduced in a predetermined order. However, the moving pictures can be reproduced in units of chapters while AV data is being reproduced.

FIG. 1 illustrates a structure of AV data recorded on a typical storage medium. As shown in FIG. 1, a storage medium (such as the medium 250 shown, for example, in FIG. 2) is typically formed with multiple layers in order to manage a structure of AV data recorded thereon. The data structure 100 includes one or more clips 110 that are recording units of a multimedia image (AV data); one or more playlists 120 that are reproducing units of multimedia image (AV data); move objects 130 including navigation commands that are used to reproduce a multimedia image (AV data); and an index table 140 that is used to specify a movie object to be first reproduced and titles of movie objects 130.

The clips 110 are implemented as one object which includes a clip AV stream 112 for an AV data stream for a high picture quality movie and clip information 114 for attributes corresponding to the AV data stream. For example, the AV data stream may be compressed according to a standard, such as the motion picture experts group (MPEG). However, such clips 110 need not require the AV data stream 112 to be compressed in all aspects of the present invention. In addition, the clip information 114 may include audio/video properties of the AV data stream 112, an entry point map in which information regarding a location of a randomly accessible entry point is recorded in units of a predetermined section and the like.

Each playlist 120 includes a playlist mark composed of marks which indicate the positions of clips 110 corresponding to the playlist 120. Each playlist 120 also includes a set of reproduction intervals of these clips 110, and each reproduction interval is referred to as a play item 122. Hence, AV data can be reproduced in units of playlists 120 and in an order of playitems 122 listed in a playlist 120.

The movie object 130 is formed with navigation command programs, and these navigation commands start reproduction of a playlist 120, switch between movie objects 130, or manage reproduction of a playlist 120 according to preference of a user.

The index table 140 is a table at the top layer of the storage medium to define a plurality of titles and menus, and includes start location information of all titles and menus such that a title or menu selected by a user operation, such as title search or menu call, can be reproduced. The index table 140 also includes start location information of a title or menu that is automatically reproduced first when a storage medium is placed on a reproducing apparatus.

However, in such a storage medium, there is no method for jumping to an arbitrary scene according to a search condition (e.g., scene, character, location, sound, or item) desired by a user and reproducing the scene. In other words, a typical storage medium does not provide a function for moving to a portion of the AV data according to a search condition (e.g., scene, character, location, sound, or item) set by the user and reproducing the portion. Therefore, the storage medium cannot offer diverse search functions.

Since AV data is compression-encoded and recorded on a conventional storage medium according to an MPEG 2 standard and multiplexed, it is difficult to manufacture a storage medium that contains metadata needed to search for a moving picture. In addition, once a storage medium is manufactured, it is almost impossible to edit or reuse AV data or metadata stored on the storage medium.

Further, a currently defined playlist mark cannot distinguish multiple angles or multiple paths. Therefore, even when AV data supports multiple angles or multiple paths, it is difficult to provide diverse enhanced search functions on the AV data.

SUMMARY OF THE INVENTION

Various aspects and example embodiments of the present invention provide an apparatus and method for reproducing a storage medium that stores metadata for providing an enhanced search function using various search keywords of audio-visual (AV) data. In addition, the present invention also provides an apparatus and method for reproducing a storage medium that stores metadata for actively providing an enhanced search function in connection with AV data in various formats.

Additional aspects and/or advantages of the invention will be set forth in part in the description which follows and, in part, will be obvious from the description, or may be learned by practice of the invention.

In accordance with an aspect of the present invention, there is provided a reproducing apparatus which reproduces audio-visual (AV) data stored in an information storage medium. The reproducing apparatus comprises a search unit arranged to search for scenes matching a search keyword by conducting an enhanced search function on the AV data with reference to metadata which contains information regarding at least one search keyword for each of the scenes of the AV data; and a reproducing unit arranged to reproduce the AV data corresponding to at least one scene found by the search unit.

The apparatus may further include a user interface receiving the search keyword input by a user and displaying search results for the search keyword.

The enhanced search function may be enabled when the AV data is reproduced along a main playback path defined by an author and may be disabled when the AV data is reproduced along a side playback path defined by a user.

When there are found scenes, the reproducing unit may display the found scenes on the user interface, receive information regarding the selection of one of the found scenes by the user, and reproduce the AV data corresponding to the selected scene.

The reproducing unit may reproduce the AV data corresponding to the scene immediately before or after the selected scene based on the user's input.

When there are found scenes, the reproducing unit may sequentially reproduce AV data corresponding to the found scenes.

When the AV data supports multiple angles, the reproducing apparatus may reproduce AV data corresponding to a predetermined angle or an angle input by the user using information regarding angles included in the metadata.

The metadata may be defined for each of the scenes. The reproducing unit may find a start position of the at least one found scene using an entry point indicating the start position of the at least one found scene. The search results may be displayed together with respective thumbnails.

In accordance with another aspect of the present invention, there is provided a method of reproducing AV data stored in an information storage medium. Such a method comprises searching for scenes matching a search keyword by conducting an enhanced search function on the AV data with reference to metadata which contains information regarding at least one search keyword for each of the scenes of the AV data; and reproducing the AV data corresponding to a scene found.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 2 is a block diagram of an example reproducing apparatus which reproduces a storage medium storing meta data for providing an enhanced search function according to an embodiment of the present invention;

FIG. 3 is a flowchart illustrating a method of reproducing a recording medium storing metadata for providing the enhanced search function according to an embodiment of the present invention;

DETAILED DESCRIPTION OF THE EMBODIMENTS

Figure 1:
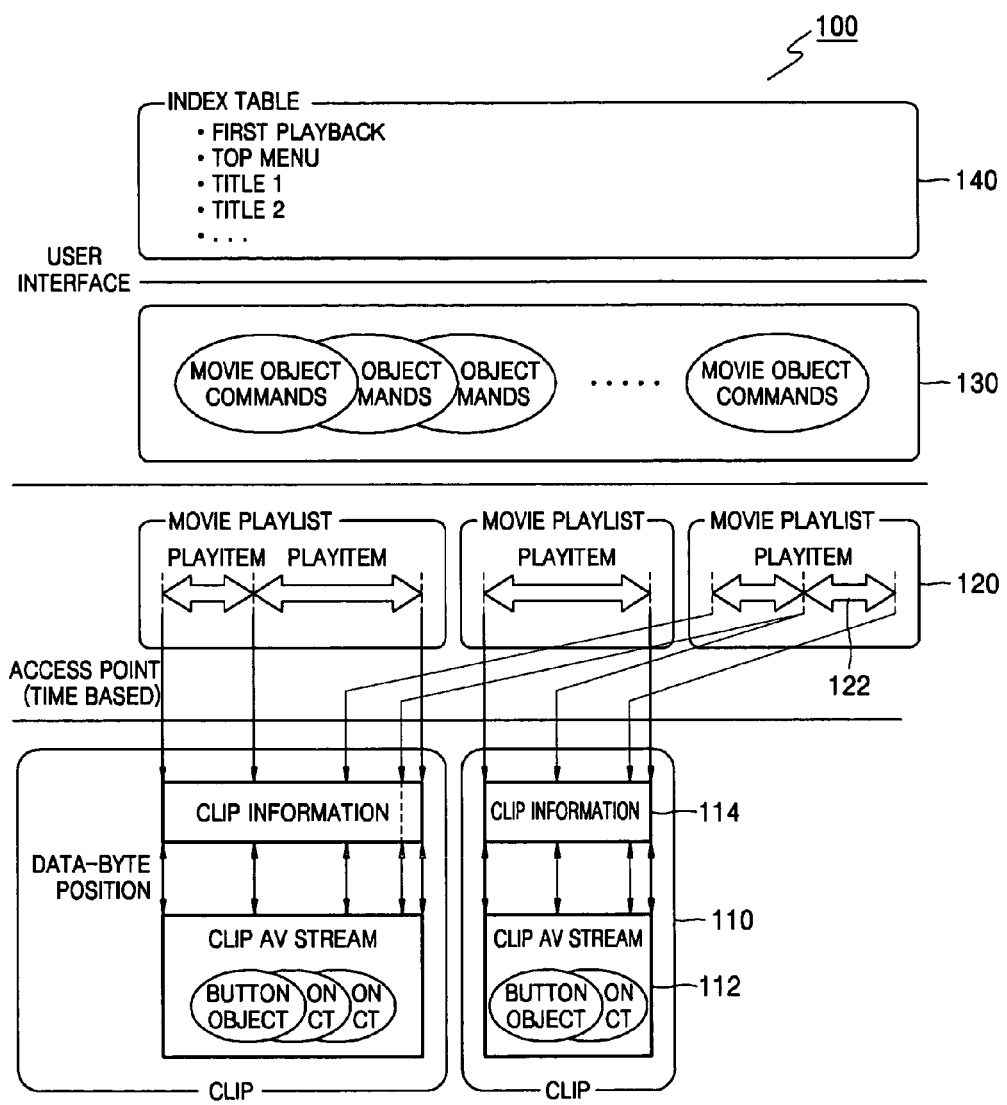
FIG. 1 illustrates a structure of AV data recorded on a typical storage medium.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 2 is a block diagram of an example reproducing apparatus which reproduces a storage medium storing metadata for providing an enhanced search function according to an embodiment of the present invention. Referring to FIG. 2, the reproducing apparatus 200 includes a reading unit 210, a reproducing unit 220, a search unit 230, and a user interface 240.

The reading unit 210 reads audio-visual (AV) data and metadata for providing the enhanced search function from a storage medium 250 such as a Blu-ray disc (BD). The reproducing unit 220 decodes and reproduces the AV data. In particular, when a user inputs a search keyword, the reproducing unit 220 receives from the search unit 230 information regarding a scene matching the search keyword and reproduces the scene. When there are multiple scenes matching the search keyword, the reproducing unit 220 displays all scenes matching the search keyword on the user interface 240 and reproduces one or more scenes selected by the user or sequentially reproduces all of the scenes. The reproducing unit 220 may also be called a playback control engine.

The search unit 230 receives a search keyword from the user interface 240 and searches for scenes matching the search keyword. Then, the search unit 230 transmits the search results to the user interface 240 to display the search results in the form of a list or to the reproducing unit 220 to reproduce the same. As illustrated in FIG. 2, search results may be presented as a list of scenes matching a search keyword.

The user interface 240 receives a search keyword input by a user or displays search results. Also, when a user selects a scene from search results, i.e., a list of scenes found, displayed on the user interface 240, the user interface 240 receives information regarding the selection.

FIG. 3 is a flowchart illustrating a method of reproducing a recording medium storing the metadata for providing the enhanced search function according to an embodiment of the present invention. Referring to the reproducing method 300 shown in FIG. 3, a user inputs a search keyword using the user interface 240, as shown in FIG. 2, at block 310. The search keyword may be a scene type, a character, an actor, an item, a location, a sound, or any word defined by an author. For example, when the movie "The Matrix" is reproduced, all scenes in which the character "Neo" appears can be searched for. Also, all scenes in which an item "mobile phone" appears can be searched for.

Next, all scenes matching the input search keyword are searched for with reference to a metadata file at block 320. The metadata file defines a plurality of scenes, and includes information regarding search keywords associated with each scene and an entry point of each scene. The structure of the metadata file will be described in detail later. Portions of AV data which correspond to found scenes are searched for using entry points of the found scenes and are reproduced at block 330. In this way, an enhanced search can be conducted on AV data using various search keywords. Hereinafter, the enhanced search function will also be referred to as a "title scene search function."

Figure 4:
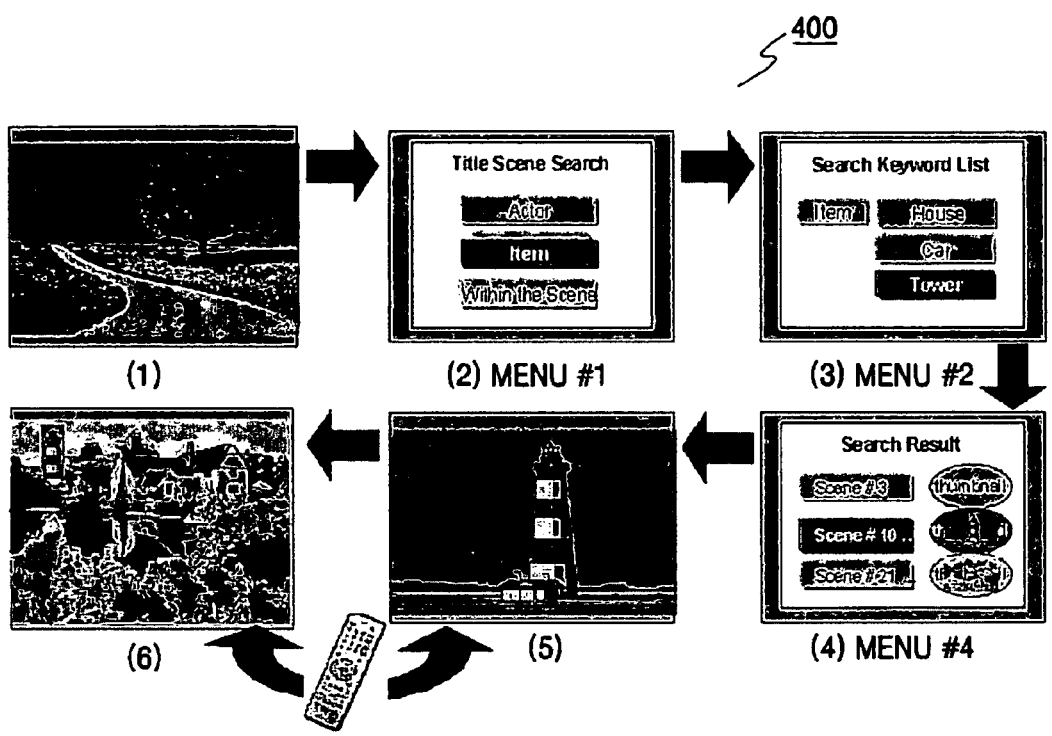
FIG. 4 illustrates example screens displayed an example of searching for a desired scene using metadata for a title scene search.

FIG. 4 illustrates example screens 400 displayed in an example of searching for a desired scene using the metadata for the title scene search. The metadata for the title scene search includes search information for each scene in AV data recorded on a storage medium 250, such as a Blu-ray disc (BD) as shown in FIG. 2. Referring to FIG. 4, while a movie title such as "The Matrix" or "The Lord of the Rings" is being reproduced at stage #1, a user selects the title scene search function using the user interface 240, as shown in FIG. 2, such as a remote controller, to search for scenes that are associated with a desired search keyword.

The user selects one of a plurality of search keyword categories displayed on the user interface 240 at stage #2, and selects a search keyword from the selected search keyword category at stage #3. For example, when the user selects "item" as a search keyword category and selects "tower" as a search keyword corresponding to "item," the movie title is searched for scenes in which "tower" appears, and search results are displayed together with respective thumbnails at stage #4. When the user selects one of the search results, i.e., found scenes, the selected scene is reproduced at stage #5. Using a command such as "skip to next search result" or "skip to previous search result" on the user interface 240, a previous or next scene can be searched for and reproduced at stage #6.

A "highlight playback" function for sequentially reproducing all scenes found can also be provided. In the highlight playback, all search results are sequentially reproduced. As a result, there is no need to wait until a user selects one of the search results. When a user selects a search keyword associated with contents, search results for the selected search keyword are obtained. The search results form the highlights of the contents associated with the selected search keyword.

The structure of the metadata for the title scene search will now be described in detail herein below.

Figure 5:
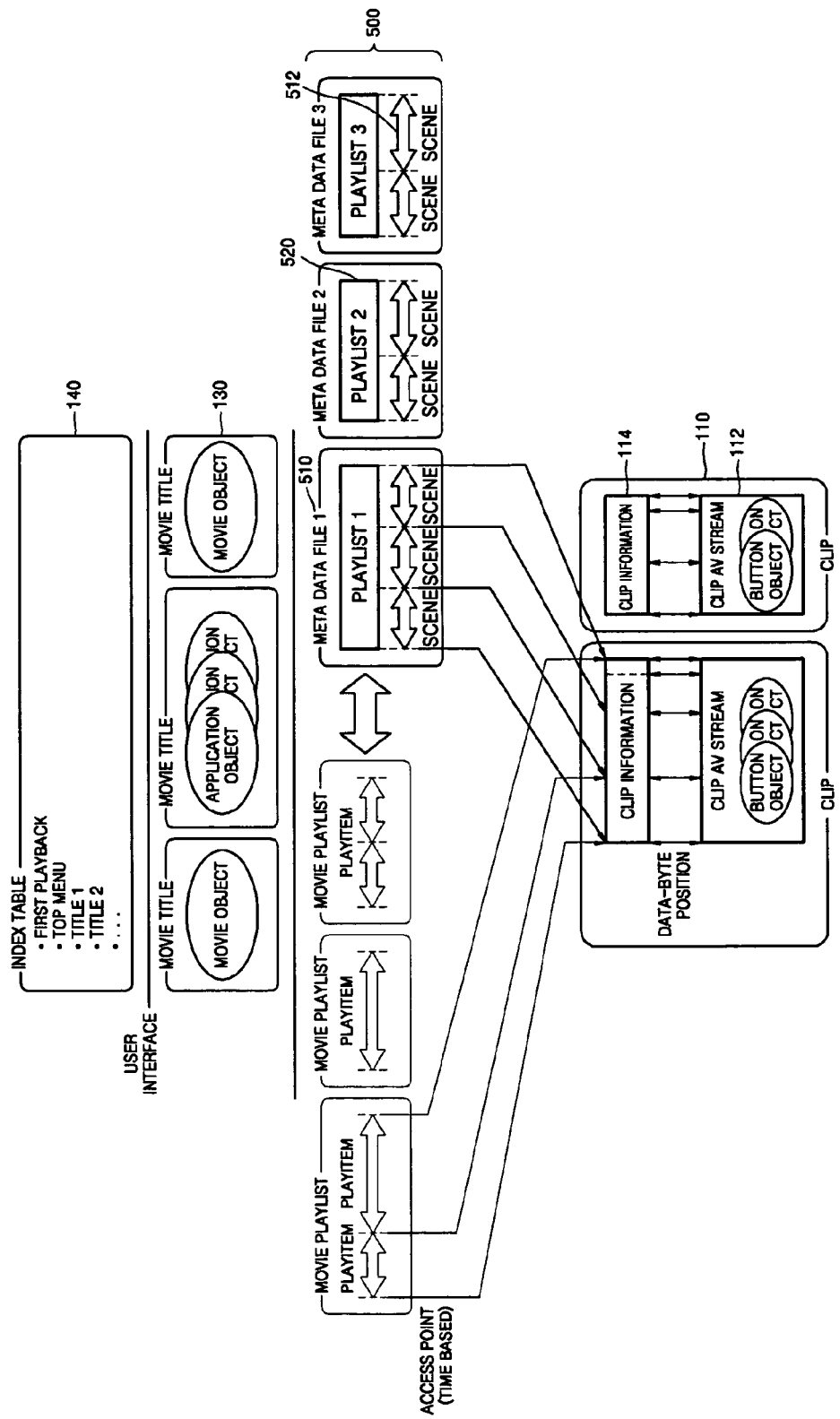
FIG. 5 illustrates the relationship between metadata for a title scene search and audio-visual (AV) data according to an embodiment of the present invention.

FIG. 5 illustrates the relationship between metadata 500 for the title scene search and AV data on a storage medium according to an embodiment of the present invention. Referring to FIG. 5, the storage medium according to an embodiment of the present invention (such as medium 250, shown in FIG. 2) stores the metadata 500 in addition to the AV data shown in FIG. 1. The metadata 500 may be stored in files separately from movie playlists, which are reproducing units.

A metadata file 510 is created for each playlist 520, and includes a plurality of scenes 512, which are author-defined sections of each playlist 520. Each scene 512 includes an entry point indicating a start position thereof. In example embodiments of the present invention, each scene 512 may further include the duration thereof.

Using an entry point (EP) map included in clip information 114, each entry point is converted into an address of a scene in a clip AV stream 112 included in each clip 110. Therefore, the start position of each scene included in a clip AV stream 112, which is real AV data, can be found using an entry point. Each scene 512 also includes information regarding search keywords associated therewith (hereinafter referred to as search keyword information). For example, the search keyword information may include the following:

Scene 1 is a battle scene,
Characters are A, B and C,
Actors are a, b and c, and
Location is x.

Accordingly, a user can search for scenes matching a desired search keyword based on the search keyword information of each scene 512. In addition, the start positions of found scenes in a clip AV stream 112 can be determined using the entry points of the found scenes, and then the found scenes can be reproduced.

Figure 6:
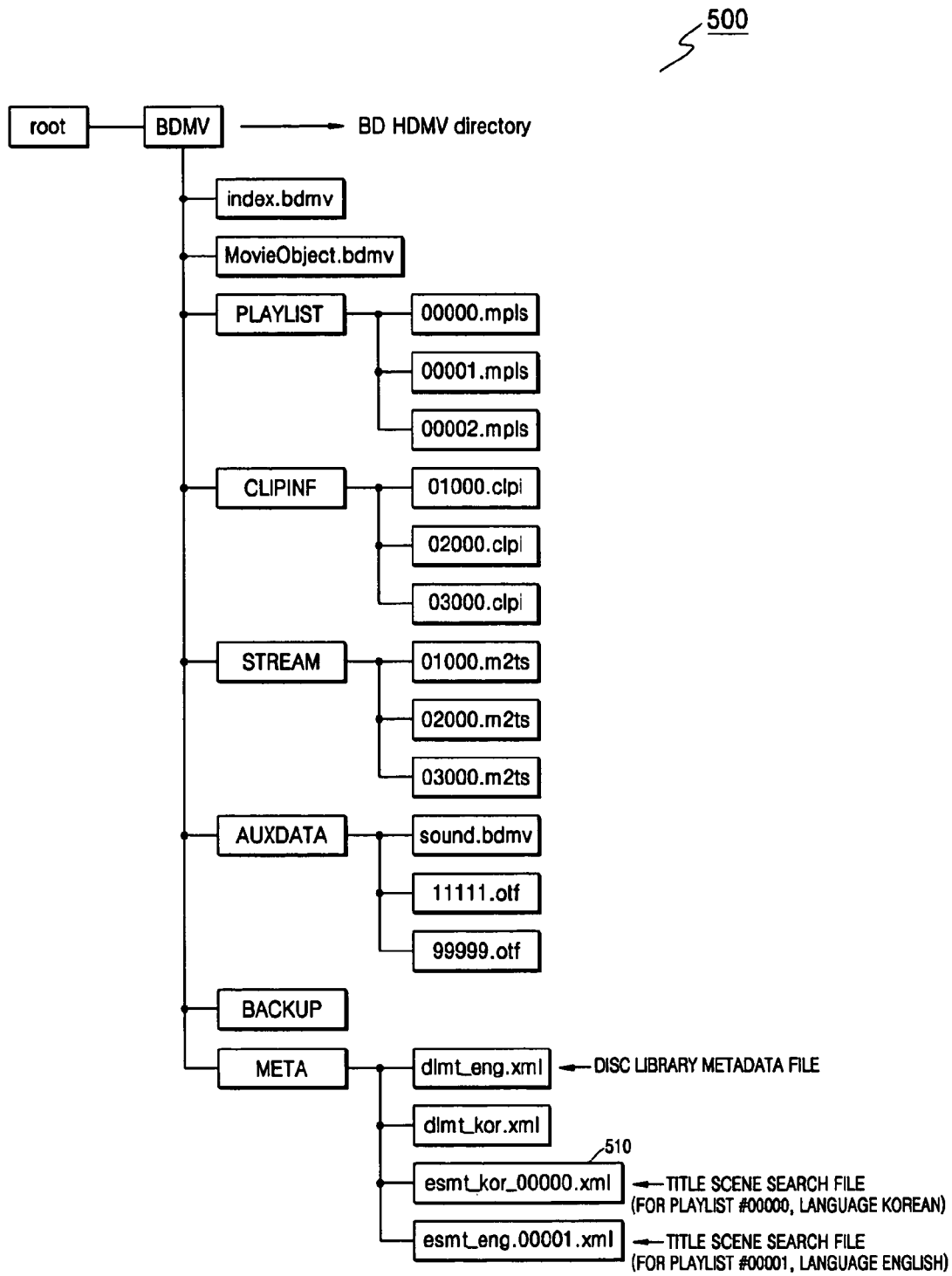
FIG. 6 illustrates a directory of metadata according to an embodiment of the present invention.

FIG. 6 illustrates a directory of metadata 500 according to an embodiment of the present invention. Referring to FIG. 6, metadata 500 related to the AV data shown in FIG. 5, is stored in files in respective directories. Specifically, an index table is stored in an index.bdmv file, a movie object is stored in a MovieObject.bdmv file, and playlists are stored in xxxxx.mpls files in a PLAYLIST directory. In addition, clip information is stored in xxxxx.clpi files in a CLIPINF directory, clip AV streams are stored in xxxxx.m2ts files in a STREAM directory, and other data is stored in files in an AUXDATA directory.

The metadata 500 for the title scene search is stored in files in a META directory separately from the AV data. A metadata file for a disc library is dlmt_xxx.xml, and a metadata file for the title scene search is esmt_xxx_yyyyy.xml. According to an embodiment of the present invention, the meta data 100 is recorded in an XML format and in a markup language for easy editing and reuse. Hence, after the storage medium is manufactured, data recorded thereon can be edited and reused.

Figure 7:
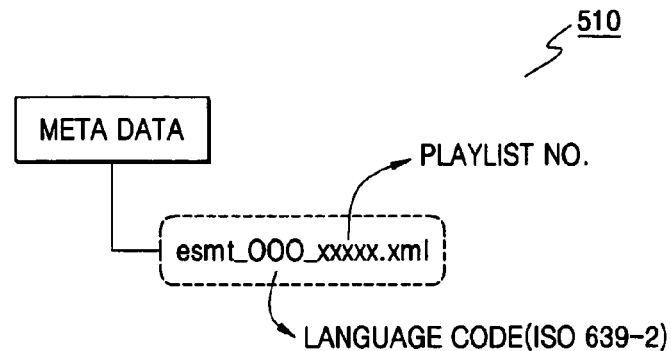
FIG. 7 illustrates a naming rule of an example metadata file according to an embodiment of the present invention.

FIG. 7 illustrates a naming rule of an example metadata file 510 according to an embodiment of the present invention. Referring to FIG. 7, the name of the metadata file 510 starts with a prefix esmt_indicating metadata 500. The next three characters indicate a language code according to an ISO 639-2 standard, and the next five characters indicate a corresponding playlist number. As described above, a metadata file 510 is created for each playlist 520, as shown in FIG. 5. In addition, a menu displayed during the title scene search can support multiple languages using the language code according to an ISO 639-2 standard.

Figure 8:
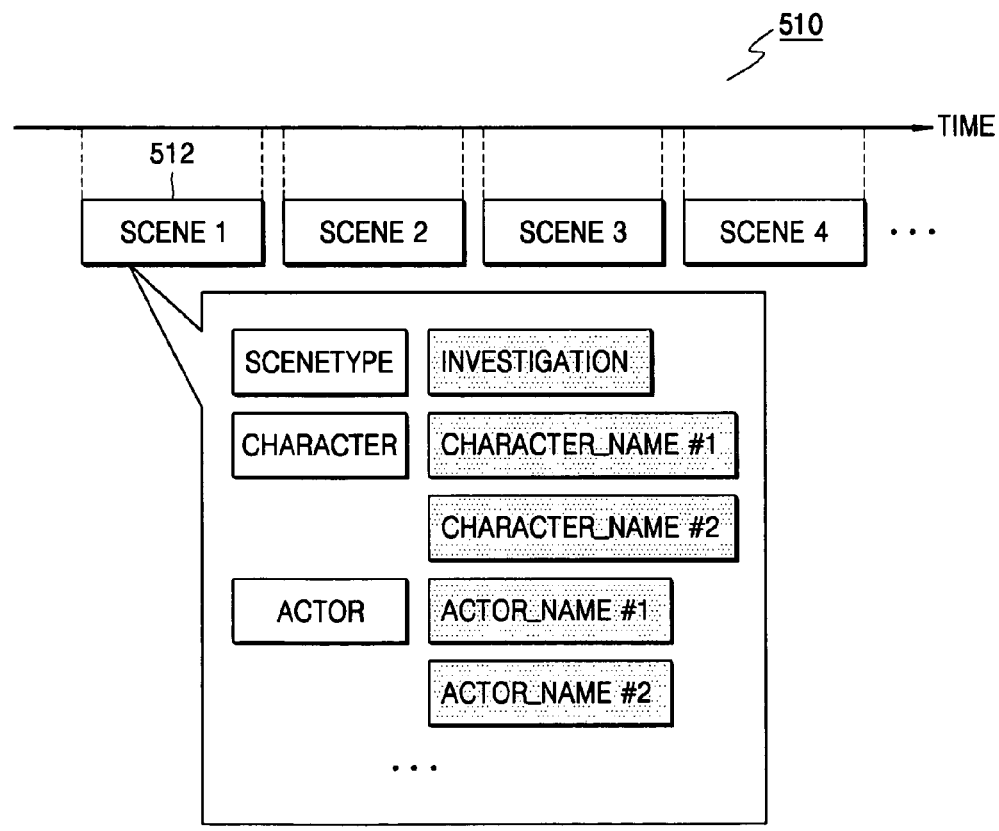
FIG. 8 illustrates the structure of metadata according to an embodiment of the present invention.

FIG. 8 illustrates the structure of an example metadata file 510 according to an embodiment of the present invention. As described in connection with FIG. 5, each metadata file 510 includes a plurality of scenes 512. Referring to FIG. 8, each scene 512 corresponds to search keywords such as a scene type, a character, actor, etc. A value of each search keyword may be expressed using a sub-element or an attribute of the search keyword according to an XML rule.

Figure 9:
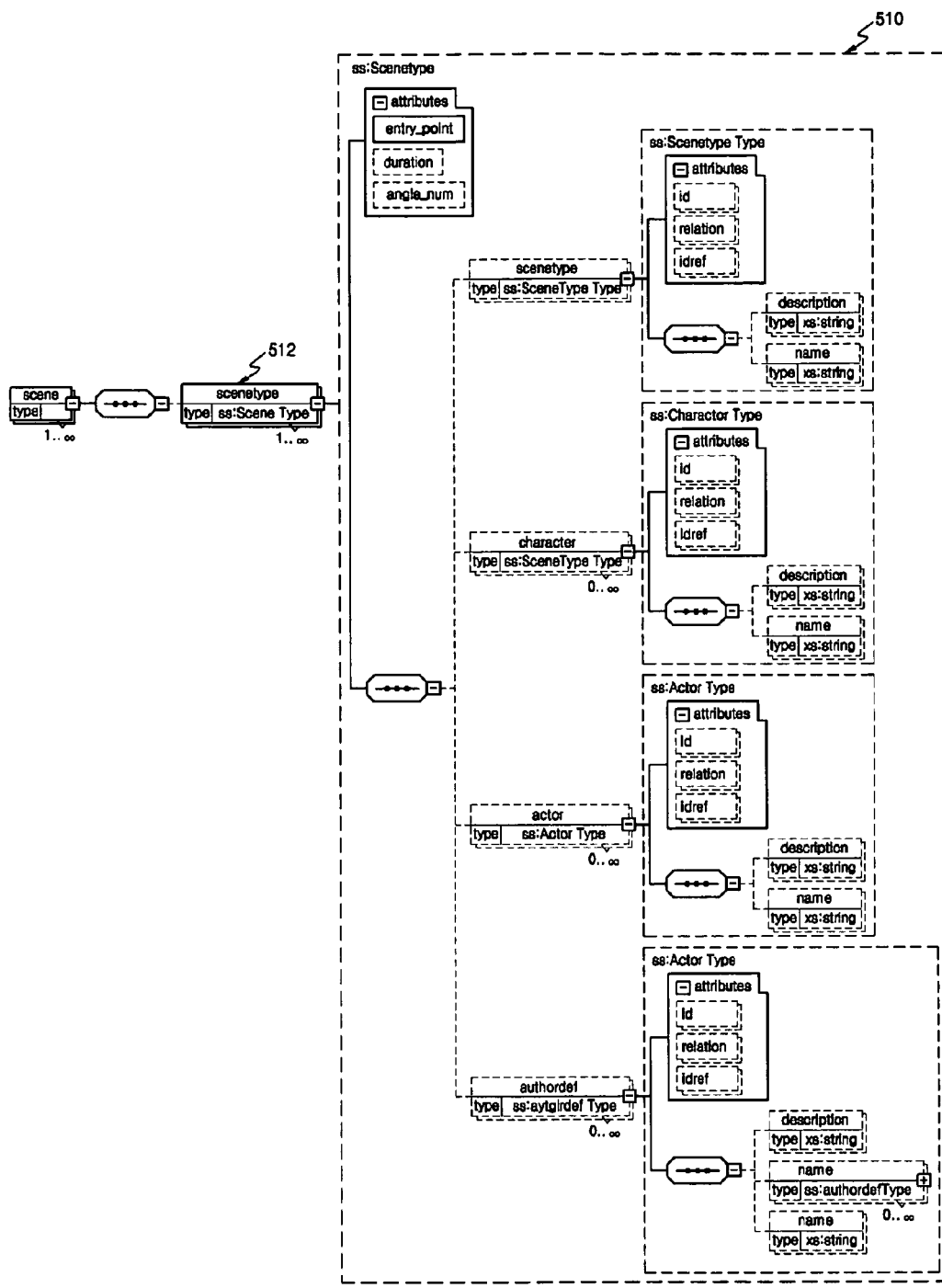
FIG. 9 illustrates a detailed structure of metadata shown in FIG. 8.

FIG. 9 illustrates a detailed structure of an example metadata file 510 shown in FIG. 8. Referring to FIG. 9, each scene 512 for the title scene search includes a scene type element, a character element, an actor element, or an "authordef" element which is an author-defined search keyword. In addition, each scene 512 includes "entry_point" indicating the start position of each scene and "duration" indicating a period of time during which each scene is reproduced. When multiple angles are supported, each scene 512 also includes "angle_num" indicating a particular angle. Whether to include "duration" and "angle_num" in each scene 512 is optional.

An example of conducting the title scene search using metadata 500 will now be described as follows.

Figure 10:
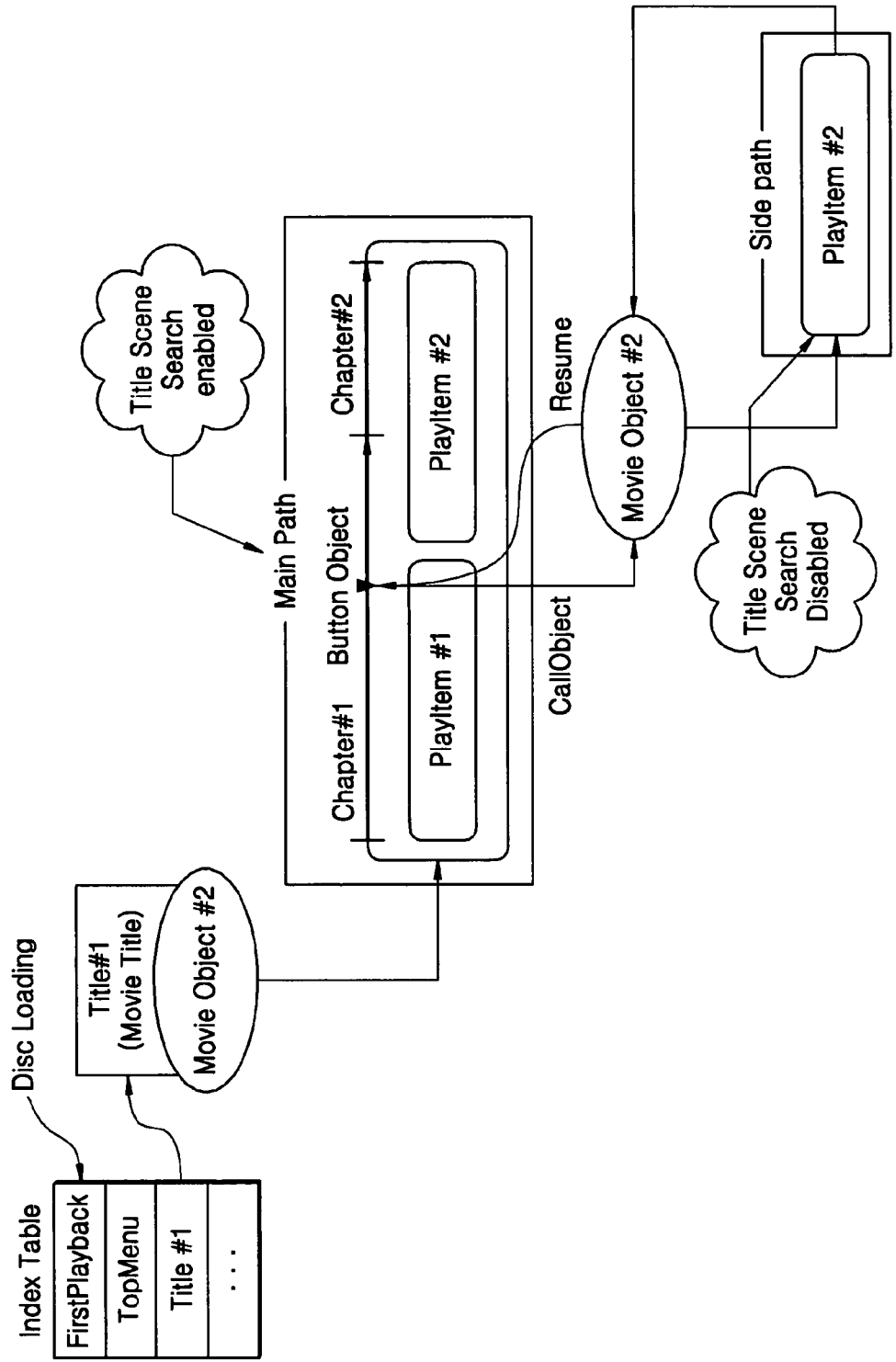
FIG. 10 illustrates the application scope of a title which provides the enhanced search function.

Specifically, FIG. 10 illustrates the application scope of a title which provides the enhanced search function according to an embodiment of the present invention. As previously shown in FIG. 5, a storage medium 250, such as a Blu-ray disc (BD), may store a movie title for reproducing a moving picture such as a movie and an interactive title including programs for providing interactive functions to users. The metadata 500 for the title scene search provides the enhanced search function while a moving picture is being reproduced. Thus, the metadata 500 is used only for movie titles. The type of title can be identified by a "Title_playback_type" field. If the "Title_playback_type" field of a title is 0b, the title is a movie title. If the "Title_playback_type" field of a title is 1b, the title is an interactive title. Therefore, the title scene search according to an embodiment of the present invention can be conducted only when the "Title_playback_type" field is 0b.

Referring to FIG. 10, when a storage medium 250, such as a Blu-ray disc (BD), is loaded into an example reproducing apparatus 200, as shown in FIG. 2, title #1 is accessed using an index table. When a navigation command "Play playlist #1" included in movie object #1 of title #1 is executed, playlist #1 is reproduced. As shown in FIG. 10, playlist #1 is composed of at least one play item. An author may arbitrarily define a chapter or a scene, regardless of a play item.

A playlist which is automatically reproduced according to the index table when a storage medium 250 is loaded into an example reproducing apparatus 200, shown in FIG. 2, is called a main playback path playlist, and a playlist which is reproduced by another movie object that a user calls using a button object while the main playback path playlist is being reproduced is called a side playback path playlist. The side playback path playlist is not within the scope of a chapter or a scene defined by an author. Therefore, according to an embodiment of the present invention, the title scene search function is enabled for the main playback path playlist and disabled for the side playback path playlist.

In summary, the application scope of the title that provides the enhanced search function has the following constraints.
1) The title scene search is applied to movie titles.
2) Metadata for the title scene search is defined in units of playlists. Since a movie title may include one or more playlists, one or more metadata may be defined for a playlist.
3) The title scene search is applied to the main playback path playlist, but not to the side playback path playlist.

Figure 11:
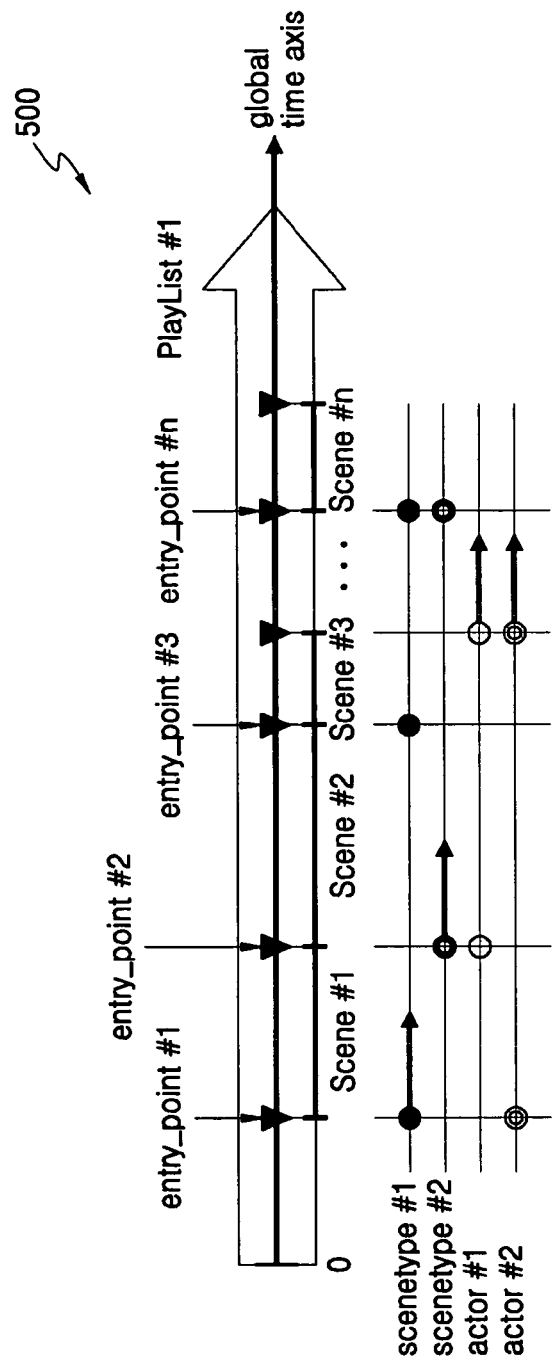
FIG. 11 illustrates an application of metadata according to an embodiment of the present invention.

FIG. 11 illustrates an application of metadata 500 according to an embodiment of the present invention. Referring to FIG. 11, scenes used in the metadata 500 are defined. The scenes are basic units used in the metadata 500 for the title scene search and basic units of contents included in a playlist. An author may designate entry points in a playlist on a global time axis. Content between two neighboring entry points is a scene.

When a user searches for contents using a search keyword, search results are represented as a group of entry points included in scenes having metadata whose search keyword information matches the search keyword. Such entry points are sequentially arranged temporally and transmitted to the playback control engine, i.e., as the reproducing unit 200 as shown in FIG. 2. The playback control engine can search for a plurality of scenes associated with identical search keywords and reproduce the scenes.

Referring to FIG. 11, entry points for each search keyword are expressed as circles. For example, when a user selects scenetype #1 as a search keyword, the search results include scene #1, scene #3, and scene #n. Then, the user may select some of scene #1, scene #3, and scene #n for reproduction. In addition, the user may navigate and reproduce previous or next search results using a user operation (UO) such as "Skip to next scene( )" or "Skip to previous scene( )" through the user interface 240, shown in FIG. 2.

Figure 12:
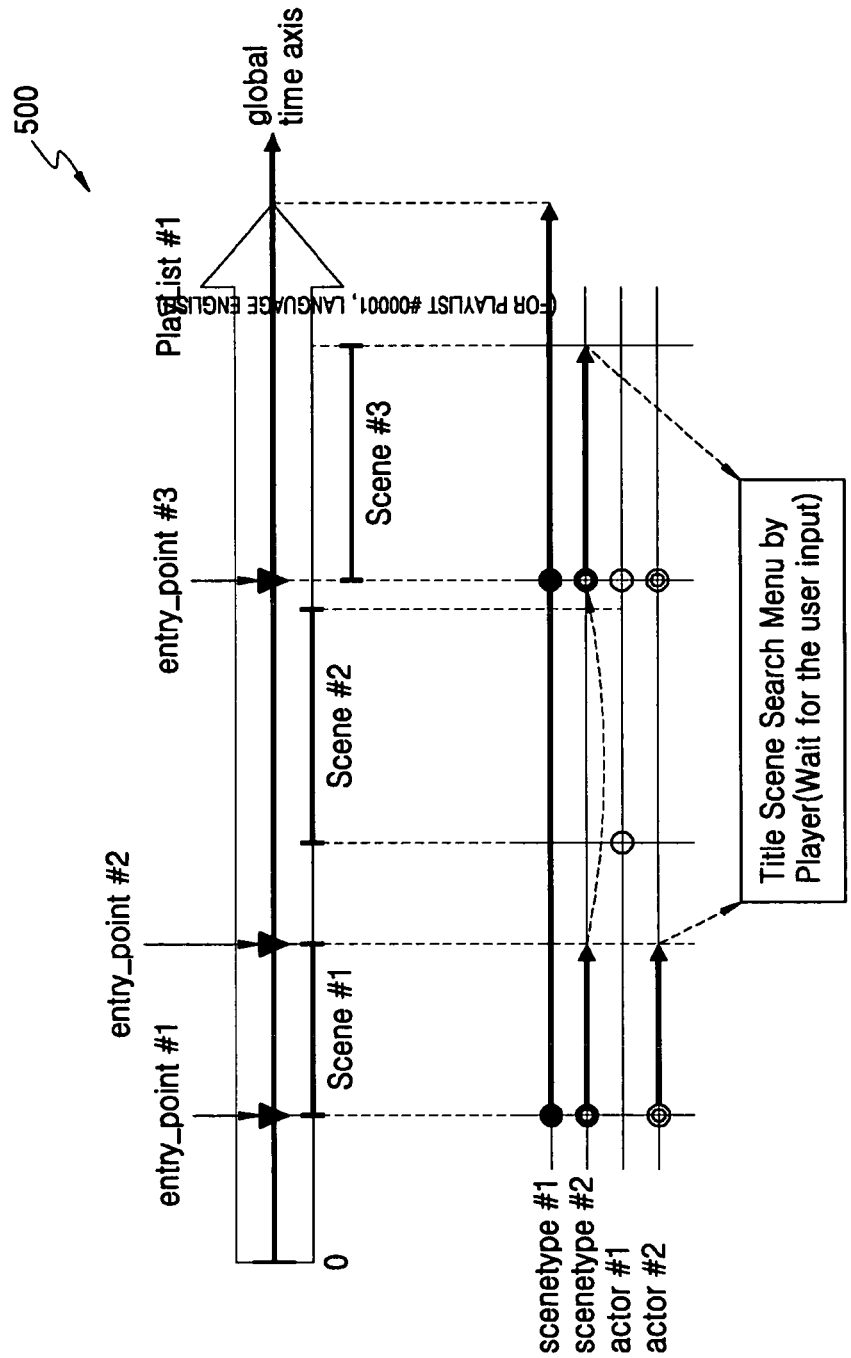
FIG. 12 illustrates an application of metadata according to another embodiment of the present invention.

FIG. 12 illustrates an application of metadata 500 according to another embodiment of the present invention. Referring to FIG. 12, scenes are defined using duration in addition to entry points described above. An interval between an entry point and a point at the end of the duration is defined as a scene. When a user selects a scene, search results can be reproduced according to three scenarios.

1) Scenario 1: Simple Playback

Regardless of duration, a playlist is reproduced from an entry point of a scene selected by a user from search results to the end of the playlist unless there is a user input. For example, when a user selects scenetype #1, playlist #1 is reproduced from an entry point of scene #1 to the end of playlist #1.

2) Scenario 2: Highlight Playback

Figure 13:
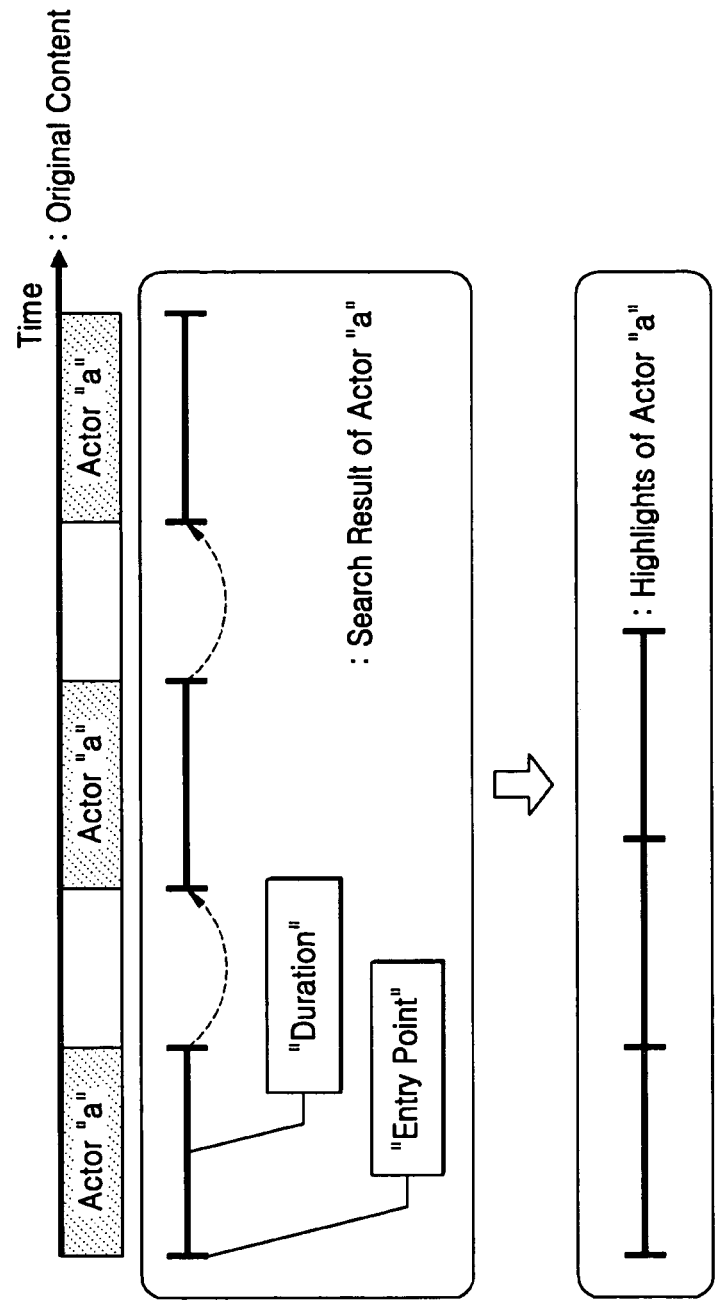
FIG. 13 illustrates an example of a highlight playback using metadata according to an embodiment of the present invention.

A playlist is reproduced from an entry point of a scene selected by a user from search results until the end of the duration of the selected scene. Then, the reproducing unit 20 jumps to a next scene and reproduces the next scene. For example, when a user selects scenetype #2, only scene #1 and scene #3, which are search results, are reproduced. In other words, only the highlights of playlist #1 which are associated with the search keyword scenetype #2 are reproduced. Another example of the highlight playback is illustrated in FIG. 13. Referring to FIG. 13, search results are sequentially reproduced. Therefore, there is no need to stop and wait for a user input after a found scene is reproduced. In other words, after one of a plurality of search results for actor "a" is reproduced, a next search result is subsequently reproduced. In this way, only the highlights of actor "a" are reproduced. For the highlight playback, each search result is expressed using a duration and an entry point. The search results can be linked and sequentially reproduced using the entry points and the duration information.

3) Scenario 3: Scene-Based Playback

Search results are reproduced by scene. In other words, a scene selected by a user from search results is reproduced from an entry point of the scene for the duration of the scene. After the duration, reproduction is stopped until a user input is received. Scenario 3 is similar to scenario 2 except that the reproduction is stopped at the end of the scene.

Figure 14:
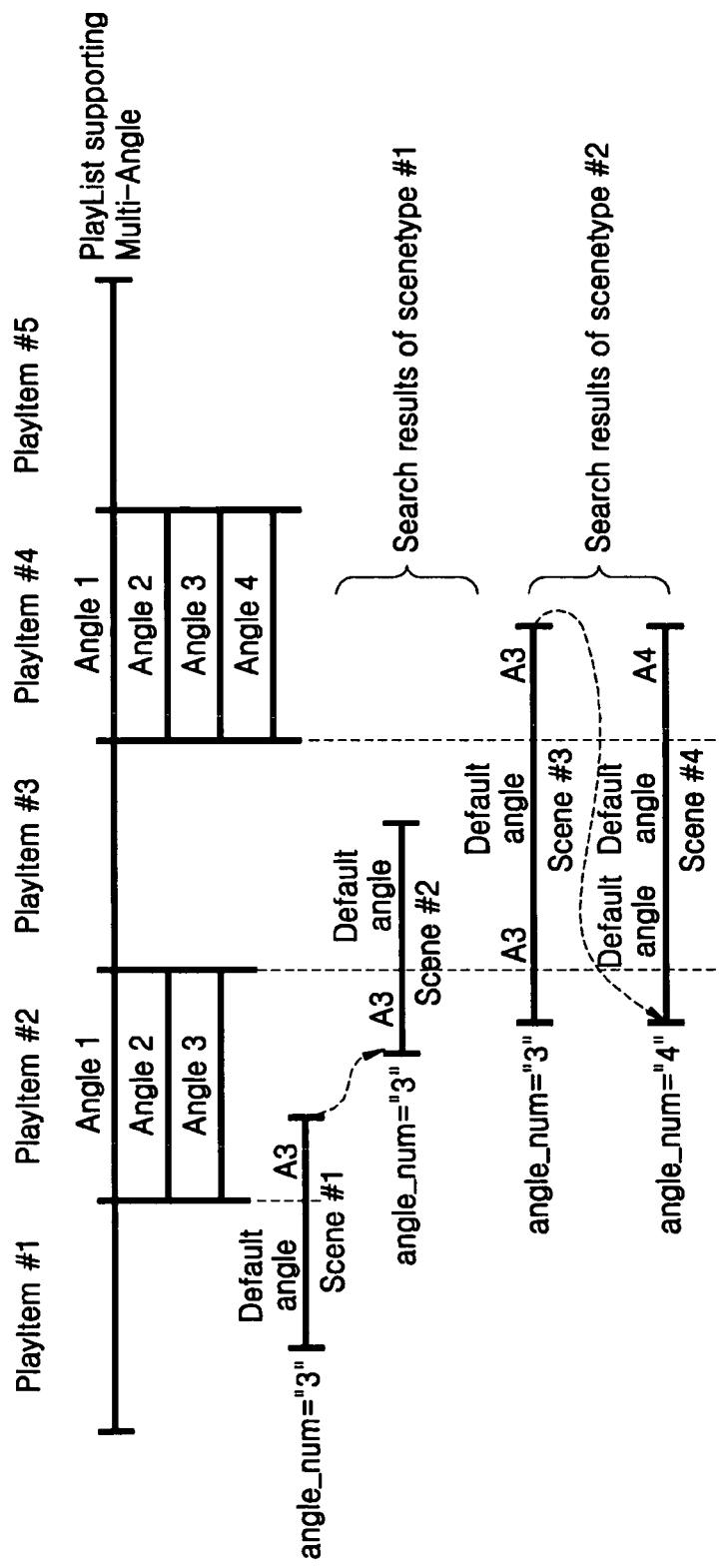
FIG. 14 illustrates a multi-angle title that provides the enhanced search function using metadata according to an embodiment of the present invention.

FIG. 14 illustrates an example multi-angle title that provides the enhanced search function using metadata 500 according to an embodiment of the present invention. Referring to FIG. 14, an example of a multi-path title composed of multiple angles is illustrated. The multi-path title is composed of five (5) play items. Of the five play items, a second (2nd) play item is composed of three (3) angles, and a fourth (4th) play item is composed of four (4) angles. In a playlist that supports multiple angles, scene #1 and scene #2 matching the search keyword scenetype #1 and scene #3 and scene scene #4 matching the search keyword scenetype #2 are found. Each scene is defined by an entry point and duration.

Found scenes can be overlapped each other because overlapping entry points can be distinguished by "angle_num" shown in FIG. 5. However, when entry points do not overlap each other, scenes found as a result of the enhanced search cannot overlap each other. When a user desires to reproduce search results according to scenario 2, the reproducing apparatus sequentially reproduces scenes along a dotted arrow in FIG. 14.

Referring to FIG. 14, scenes which cover a portion of a play item or a plurality of play items are illustrated. In each scene, the metadata 500 of AV data thereof is defined.

In the case of play items which support multiple angles (for example, the second and fourth play items), the metadata 500 is applied to AV data corresponding to one of the supported multiple angles. For example, in the case of scene #1, parts of first and second play items are defined as a reproduction section, and a value of angle_num is three. The value of angle_num is applied only to play items that support multiple angles. Therefore, play items that do not support multiple angles are reproduced at a default angle. A player status register (PSR), 3 which is a state register of the reproducing apparatus 200, as shown, for example, in FIG. 2, is designated as a default angle. Accordingly, when scene #1 is reproduced, play item #1 which does not support multiple angles is reproduced at the default angle, and play item #2 which supports multiple angles is reproduced at angle 3 according to the value designated as the attribute of angle_num. In this case, search keywords defined for scene #1 for the title scene search are applied to angle 3 for play item 2 that supports multiple angles. As described above, when metadata 500 including angle_num is used, a title which supports multiple angles can also provide various enhanced search functions according to a designated search keyword.

Figure 15:
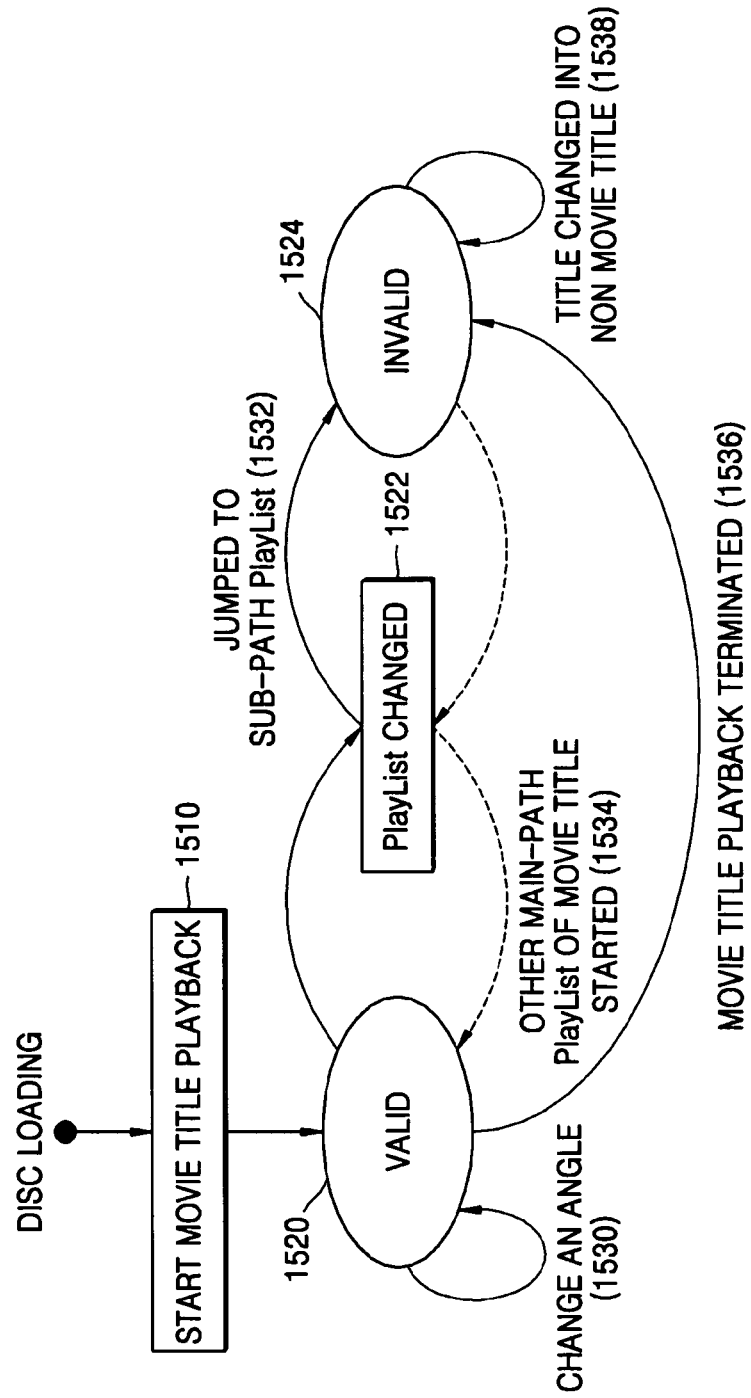
FIG. 15 illustrates a reproducing process of an example reproducing apparatus according to an embodiment of the present invention.

FIG. 15 illustrates a reproducing process of an example reproducing apparatus according to an embodiment of the present invention. Referring to FIG. 15, the reproducing apparatus 200, shown in FIG. 2, provides the title scene search function while reproducing a movie title. When a storage medium 250, such as a Blu-ray disc (BD), is loaded into the reproducing apparatus 200 and the reproduction of a movie title starts (operation 1510), the title scene search function is activated to be in a valid state (operation 1520). As described with reference to FIG. 14, when a movie title that supports multiple angles is reproduced, the title scene search can be conducted by changing an angle (operation 1530). In addition, if a multi-path playlist is supported (operation 1522), when a playlist is changed to a main playback path playlist, the title scene search function is activated to be in the valid state (operation 1534). However, when the playlist is changed to a side playback path playlist, the title scene search function becomes invalid (operation 1532). Further, when a title is changed to an interactive title, not a movie title, the title scene search function becomes invalid (operation 1538).

As described above, the present invention provides a storage medium storing metadata for providing an enhanced search function using various search keywords for AV data, an apparatus and method for reproducing the storage medium. The present invention can also provide the enhanced search function in connection with AV data in various formats.

In other words, the metadata for providing the enhanced search function is defined by scene by an author, and each scene includes information regarding at least one search keyword. In addition, each scene includes information regarding an entry point and/or duration, angles, and so on. Hence, the enhanced search function can be conducted using various search keywords.

Further, search results can be reproduced according to diverse scenarios, and the enhanced search function can be provided for movie titles that support multiple angles or multiple paths. Moreover, metadata can be created in multiple languages, thereby enabling the provision of the enhanced search function that supports multiple languages.

Example embodiments of the enhanced search method according to the present invention can also be written as a computer program and can be implemented in a general digital computer that executes the computer program recorded on a computer-readable medium. Codes and code segments constructing the computer program can be easily induced by computer programmers in the art. The computer-readable medium can be any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention. For example, any computer readable media or data storage devices may be utilized, as long as metadata is included in the playlist in the manner shown in FIG. 5 through FIG. 15. In addition, metadata can also be configured differently as shown in FIG. 5. Moreover, a reproducing apparatus as shown in FIG. 2 can be implemented as part of a recording apparatus, or alternatively a single apparatus for performing recording and/or reproducing functions with respect to a storage medium. Similarly, the CPU can be implemented as a chipset having firmware, or alternatively, a general or special purposed computer programmed to perform the methods as described, for example, with reference to FIG. 3, and FIGS. 10-15. Accordingly, it is intended, therefore, that the present invention not be limited to the various example embodiments disclosed, but that the present invention includes all embodiments falling within the scope of the appended claims.

What is claimed is:

1. A reproducing apparatus which reproduces audio-visual (AV) data stored on an information storage medium, the AV data supporting multi-angle, the apparatus comprising:
    a reading unit configured to read:
        audio-visual (AV) data; and
        metadata configured for conducting a title scene search of the AV data by scene, from the information storage medium, the metadata comprising angle information indicating an angle number of an angle supported by a corresponding scene and at least one search keyword to be used for searching AV data corresponding to the angle supported by the corresponding scene; and
    a reproducing unit configured to reproduce the searched AV data,
    wherein the title scene search is applicable when the AV data is reproduced along a main playback path, and
    wherein the title scene search is not executable when the AV data is reproduced along a side playback path.

2. A non-transitory computer readable information storage medium formed to manage a data structure of audio-visual (AV) data recorded thereon, the AV data supporting multi-angle, the non-transitory computer readable information storage medium comprising:

one or more clips that are recording units of AV data, each clip being implemented as one object including a clip AV stream for AV data and clip information for attributes corresponding to the AV data;

one or more playlists that are reproducing units of AV data, each playlist including a set of playitems corresponding to reproduction intervals of the clips; and metadata created for each playlist configured for providing a title scene search on the AV data, the metadata being defined scene by scene, the metadata comprising angle information indicating an angle number of an angle supported by a corresponding scene and at least one search keyword to be used for searching AV data corresponding to the angle supported by the corresponding scene, the title scene search being applicable when the AV data is reproduced along a main playback path, the title scene search being not executable when the AV data is reproduced along a side playback path.

3. The non-transitory computer readable information storage medium of claim 2, further including a highlight playback function configured to sequentially reproduce all found scenes.

4. The non-transitory computer readable information storage medium of claim 2, wherein each scene comprises duration information.

5. The non-transitory computer readable information storage medium of claim 2, wherein the metadata for the title scene search is defined in units of playlists and, one or more metadata is defined for a playlist.

6. The non-transitory computer readable information storage medium of claim 2, wherein an enhanced search function is enabled in response to the AV data being reproduced along the main playback path defined by an author and is disabled in response to the AV data being reproduced along the side playback path defined by a user.

7. A method of reproducing audio-visual (AV) data stored on an information storage medium, the AV data supporting multi-angle, the method comprising:

reading:
audio-visual (AV) data; and
metadata for conducting a title scene search of the AV data by scene, from the information storage medium, the metadata comprising angle information indicating an angle number of an angle supported by a the corresponding scene and at least one search keyword to be used for searching AV data corresponding to the angle supported by the corresponding scene; and reproducing the searched AV data, wherein the title scene search is applicable when the AV data is reproduced along a main playback path, and wherein the title scene search is not executable when the AV data is reproduced along a side playback path.

* * * * *